US005839474A

United States Patent [19]

Greaney

[11] Patent Number: 5,839,474

[45] Date of Patent: Nov. 24, 1998

[54] MIX HEAD EDUCTOR

[75] Inventor: Michael J. Greaney, Castro Valley, Calif.

[73] Assignee: SC Johnson Commercial Markets, Inc., Sturtevant, Wis.

[21] Appl. No.: 588,802

[22] Filed: Jan. 19, 1996

[51] Int. Cl.[6] .................................................... F16K 24/04

[52] U.S. Cl. .......................... 137/889; 137/216; 137/888; 417/76; 417/151

[58] Field of Search .................................... 137/888, 889, 137/893, 216; 417/151, 76

[56] References Cited

U.S. PATENT DOCUMENTS

| | | | |
|---|---|---|---|
| 262,069 | 8/1882 | Mack . | |
| 280,079 | 6/1883 | Porter . | |
| 280,589 | 7/1883 | Dimelow . | |
| 323,325 | 7/1885 | Hambruch . | |
| 332,953 | 12/1885 | Sherriff . | |
| 412,032 | 10/1889 | Mack . | |
| 736,664 | 8/1903 | Williams . | |
| 912,106 | 2/1909 | Frazier . | |
| 1,102,505 | 7/1914 | Henderson . | |
| 1,195,915 | 8/1916 | Damrow . | |
| 1,419,798 | 6/1922 | Bacharach . | |
| 1,662,095 | 3/1928 | Woodsome . | |
| 1,920,721 | 8/1933 | Tirrell . | |
| 1,954,105 | 4/1934 | Stoddard . | |
| 2,030,853 | 2/1936 | Budwig . | |
| 2,056,357 | 10/1936 | Luff . | |
| 2,061,932 | 11/1936 | Budwig . | |
| 2,250,291 | 7/1941 | Boosey . | |
| 2,288,247 | 6/1942 | Kunstorff . | |
| 2,382,391 | 8/1945 | Berman . | |
| 2,401,914 | 6/1946 | Pietro . | |
| 2,408,664 | 10/1946 | Lloyd . | |
| 2,489,636 | 11/1949 | Gurley . | |
| 2,694,404 | 11/1954 | Luft . | |
| 2,704,555 | 3/1955 | Dall . | |
| 2,724,583 | 11/1955 | Targosh . | |
| 2,744,791 | 5/1956 | Budwig . | |
| 2,785,012 | 3/1957 | Frewin . | |
| 2,785,833 | 3/1957 | Bauerlein . | |
| 2,800,313 | 7/1957 | Targosh . | |
| 2,881,800 | 4/1959 | Bauerlein . | |
| 2,891,913 | 6/1959 | Welford . | |
| 2,919,073 | 12/1959 | Akselrad . | |
| 2,940,673 | 6/1960 | Budwig . | |
| 2,941,696 | 6/1960 | Homm . | |
| 2,948,480 | 8/1960 | Budwig . | |
| 2,951,645 | 9/1960 | Price . | |
| 2,952,412 | 9/1960 | Munson . | |
| 2,973,718 | 3/1961 | Deutsch | 137/889 |
| 2,999,514 | 9/1961 | Kryzer . | |
| 3,018,799 | 1/1962 | Volkmann . | |
| 3,027,097 | 3/1962 | Gleason . | |
| 3,032,274 | 5/1962 | Budwig . | |
| 3,034,731 | 5/1962 | Chapin . | |
| 3,042,077 | 7/1962 | Waddington . | |

(List continued on next page.)

FOREIGN PATENT DOCUMENTS

| | | |
|---|---|---|
| 216557 | 5/1908 | Germany . |
| 1428452 | 1/1969 | Germany . |
| 74 13 719 | 5/1975 | Germany . |
| 92 09 823.1 | 12/1992 | Germany . |
| 93 06 595.7 | 9/1993 | Germany . |
| 881320 | 1/1961 | United Kingdom . |
| WO 95/34778 | 12/1995 | WIPO . |

*Primary Examiner*—Denise L. Ferensic
*Assistant Examiner*—Ramyar Farid
*Attorney, Agent, or Firm*—Fliesler, Dubb, Meyer & Lovejoy

[57] ABSTRACT

An eductor apparatus 20 includes a fluid inlet port 30 which directs fluid through an air gap 32 to an eductor 42. A rib 38 deflects any fluid which bounces off of the eductor 42 so that the fluid is retarded from exiting through an air gap port 34. The eductor 42 is of a one-piece construction having a specially designed inlet port 44 and exterior surface 116 thereabout in order to ensure attached flow and thereby reduce the amount of fluid which bounces off the exterior surface 116 and which is directed back upstream toward the air gap port 34.

24 Claims, 7 Drawing Sheets

U.S. PATENT DOCUMENTS 3,072,137 1/1963 McDougall .
3,088,679 5/1963 Ford .
3,158,169 11/1964 Smith .
3,166,020 1/1965 Cook .
3,166,086 1/1965 Holmes .
3,207,445 9/1965 Court .
3,231,200 1/1966 Heald .
3,273,866 9/1966 Lancy .
3,298,669 1/1967 Zingg .
3,303,800 2/1967 Young .
3,323,686 6/1967 Roth .
3,365,383 1/1968 Blair .
3,445,067 5/1969 Sheldall .
3,470,826 10/1969 Foulds .
3,473,481 10/1969 Brane .
3,595,442 7/1971 Shapiro .
3,727,640 4/1973 Sargeant .................................. 137/889
3,768,962 10/1973 Baranowski, Jr. .
3,797,747 3/1974 Buzzi .
3,826,474 7/1974 Pareja .
3,853,784 12/1974 Rogers .................................... 137/889
3,861,596 1/1975 Nathan et al. .
3,862,640 1/1975 Hechler .
3,863,843 2/1975 Hechler, IV .
3,865,136 2/1975 Verschuur .
3,933,179 1/1976 Hechler .
3,938,550 2/1976 Hechler .
3,940,069 2/1976 Gunzel, Jr. .
4,014,363 3/1977 Hechler .
4,033,509 7/1977 Sheets .
4,068,681 1/1978 McNair .
4,132,247 1/1979 Lindberg .
4,142,681 3/1979 Hechler, IV .
4,213,796 7/1980 Shaffer .
4,218,013 8/1980 Davison .................................. 137/889
4,247,046 1/1981 Hechler, IV .
4,298,018 11/1981 Haggard .
4,315,601 2/1982 Brooker .
4,414,998 11/1983 Rudler .
4,416,610 11/1983 Gallagher, Jr. .
4,467,830 8/1984 Hutchinson .
4,538,636 9/1985 Cleland .
4,612,926 9/1986 Boiarski .
4,623,095 11/1986 Pronk .
4,633,909 1/1987 Louboutin .
4,634,559 1/1987 Eckert .
4,653,676 3/1987 Stull .
4,697,610 10/1987 Bricker et al. .
4,721,126 1/1988 Horii .
4,817,825 4/1989 Freese .
4,878,619 11/1989 Norman .
4,881,575 11/1989 Smith ..................................... 137/889
4,938,421 7/1990 Berfield .
4,951,699 8/1990 Lipman .
4,984,306 1/1991 Summerix .
5,071,070 12/1991 Hardy .
5,100,059 3/1992 Englhard .
5,133,498 7/1992 Sealy .
5,159,958 11/1992 Sand ....................................... 137/888
5,211,475 5/1993 McDermott .
5,240,029 8/1993 Ludewig .
5,253,677 10/1993 Sand ....................................... 137/888
5,255,820 10/1993 Thomas .
5,259,557 11/1993 Spriggs et al. .
5,305,778 4/1994 Traylor .
5,344,074 9/1994 Spriggs et al. .
5,377,718 1/1995 Sand ....................................... 137/893
5,383,603 1/1995 Englhard et al. .
5,409,146 4/1995 Hazard et al. .
5,518,020 5/1996 Nowicki .................................. 137/888
5,522,419 6/1996 Sand ....................................... 137/888
5,544,810 8/1996 Horvath, Jr. et al. .
5,678,592 10/1997 Boticki .................................. 137/216

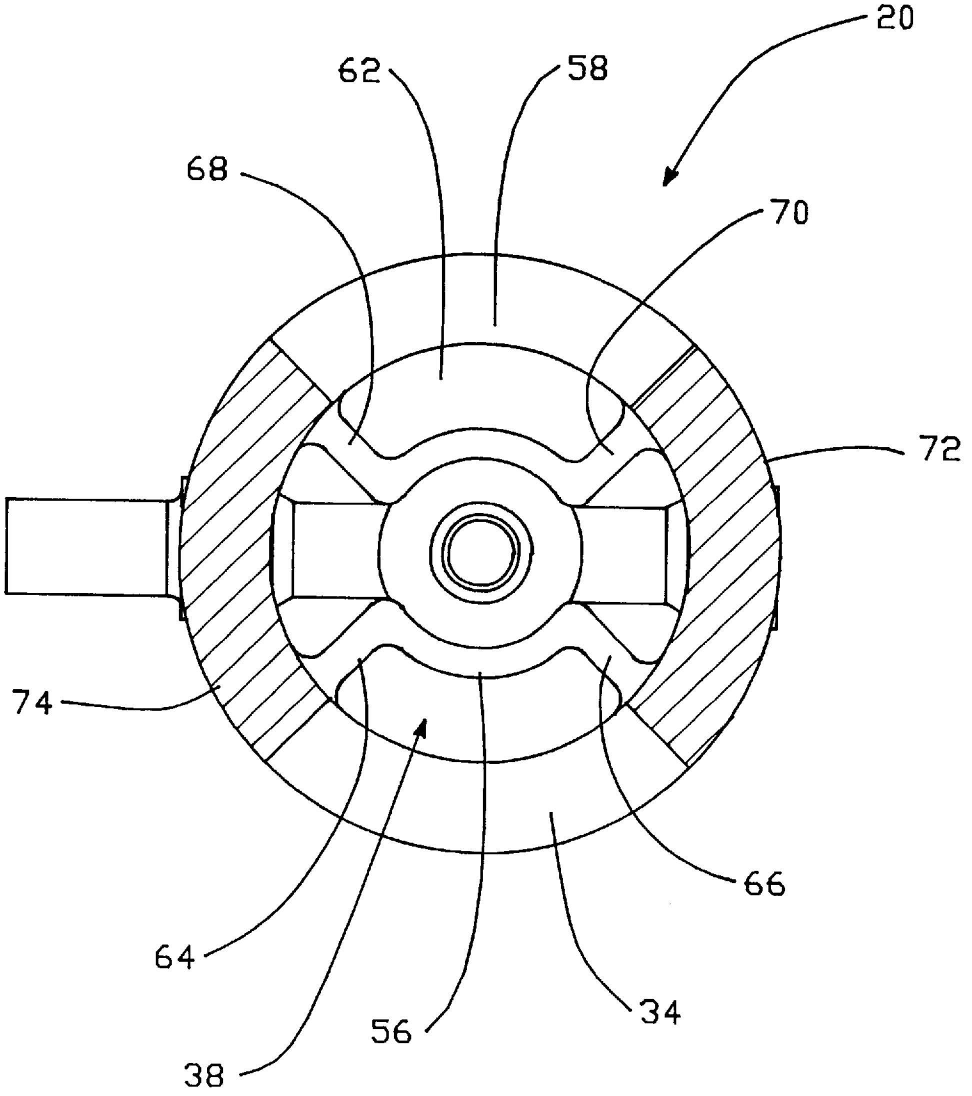
FIG.−4

MIX HEAD EDUCTOR

FIELD OF THE INVENTION

The present invention is directed towards a mix head eductor for mixing concentrated chemicals using preferably water from a public water supply and for dispensing said mixture.

BACKGROUND OF THE INVENTION

For purposes of making the public water supply safe, cities, municipalities, and states have strict codes and standards which must be applied when there is a direct hookup of a device to the public water supply. Such codes and standards apply whether the hookup is for, by way of example, a dishwasher or a clothes washer, as well as for a device that dispenses chemicals. The codes ensure that any device that is hooked up to the public water supply will not in any way contaminate the public water supply by drawing, siphoning or allowing back flow of any contaminants such as soap from the dishwasher or clothes washer, or chemicals such as disinfectants and cleaners from dispensing devices. Further, these public entities wish to be able to inspect such devices to ensure that these devices cannot become clogged, or blocked, or in any way rendered ineffective.

In order to satisfy such codes, and by way of example only, a series of air gap devices have been developed to ensure that only air and not potentially toxic chemicals can be drawn into the public water supply. One particular application of such an air gap device is for the mixing and dispensing of concentrated chemicals in the nature of concentrated liquid cleaners and disinfectants. It is more efficient to produce, distribute and sell concentrated cleaners and disinfectants and then have such chemicals accurately diluted at the job site, than to manufacture, distribute and sell such chemicals at much lower direct application concentrations.

Accordingly, there needs to be a device which will both accurately dilute the concentrated chemicals and at the same time prevent any contamination of the water source through back flow or siphoning. To be used generally over the broad range of application for cleaning and disinfecting chemicals, the mixing device needs to be relatively easy and inexpensive to manufacture, inspect and install. It must be compatible with public water systems and provide the necessary air gap as well as a concentrated chemical mixer which is sufficiently accurate to repeatedly provide, over a long life cycle, the needed dilution rate appropriate for the cleaning or disinfecting task. As fluid flow is highly influenced by dimensions, contours and smoothness, and such fluid flow can influence the mix ratio or dilution rate, such a device must sustain repeated usage without changes in such features.

SUMMARY OF THE INVENTION

Accordingly, the present invention is designed to meet the need for a mixer which can safely, repeatably, and efficiently dilute and dispense concentrated chemicals such as cleaners and disinfectants without running the risk of contaminating the source of diluting fluids, which can be a public water supply.

A first embodiment of the eductor such as a mix head or proportioning eductor of the invention includes a fluid inlet port which can be directly connected to a source of public water. The fluid inlet port is shaped to provide for a smooth collimated flow of fluid through an air gap, which air gap is designed to prevent back flow or siphoning of any chemicals or contaminants into the public water supply. Downstream of the air gap is a mixer or eductor. The eductor includes an inlet port for receiving the stream of water and a concentrate inlet port for connecting to a source of concentrated fluid. The mix head eductor further includes a rib which is located adjacent to the water inlet port in order to deflect fluid which may bounce back after striking the outer surfaces of the water inlet port. The rib thus prevents such fluid from escaping the air gap.

In another aspect of the invention, the rib includes a semicylindrical portion which is located about the stream of fluid in order to effectively prevent such fluid from escaping from the air gap.

In yet another aspect of the invention, the air gap includes two or more ports which allow air to enter the mix head eductor in order to prevent contamination of the public water supply. In this embodiment, two or more ribs are employed, each rib having preferably a semicylindrical portion. The semicylindrical portions are positioned about the collimated fluid dispensed from the inlet port through the air gap to the eductor in order to effectively prevent water from striking and then bouncing off of the eductor and exiting from the air gaps.

In another embodiment of the invention, the rib has walls extending from the semicylindrical part to the body of the mix head eductor in order to properly position the rib adjacent to the stream of water. These walls can be positioned in such a manner so as to be parallel to each other or preferably, angled back from the semicylindrical part, as such walls are not required for purposes of preventing water from exiting from the air gap.

In yet another aspect of the invention, the mix head eductor includes an eductor located downstream of an inlet port. The inlet port directs fluid to a fluid inlet port of the eductor. The eductor has an exterior surface adjacent to the eductor inlet port which is designed to cause the fluid to be attached to the exterior surface for a distance past the eductor inlet port in order to reduce the amount of fluid which could bounce off of the eductor and potentially escape through the air gap.

In a further aspect of the invention, the exterior surface is rounded and is preferably tangential to the eductor inlet port.

In another aspect of the invention, the exterior surface is comprised of a compound shape, a first rounded surface described by a first radius and a second rounded surface extending therefrom described by a second radius. The first radius allows the exterior surface to be substantially tangential to the eductor inlet port while the second causes the fluid stream to be attached to the exterior surface for a greater distance.

In yet another aspect of the invention, the eductor has a inwardly tapered inlet port. The eductor inlet port is designed in such a manner that a stream of water directed through the air gap strikes the center of the inlet port of the eductor. Additionally, a peripheral portion of the stream strikes the exterior surface of the eductor adjacent to the eductor inlet port and flows over and parallel to the exterior surface of the eductor.

In still a further aspect of the invention, a mix head eductor is comprised of an eductor with a one-piece construction having first and second inlet ports and a first outlet port. The first eductor inlet port receives a source of diluting fluid such as water from a public water supply. The second eductor fluid inlet port receives a concentrated fluid such as a cleaner or disinfectant, as drawn into the eductor by the effect of the stream of water received by the first inlet port. The first outlet port is for allowing the mixture of water and concentrate to exit the eductor. Such one-piece construction allows the eductor to operate efficiently, properly mixing or proportioning the concentrated fluid with the diluting fluid for the entire life of the device. The one-piece construction ensures that chemical components as well as contaminants, minerals and other particles which may be contained in the diluting fluid or concentrated fluid will not be able to lodge in, plate onto, or otherwise reconfigure the eductor, and thus will not disturb the mix or proportioning ratio. Chemical components in the concentrates can subtly change the surface of the exposed eductor parts enough to break seals, if present, between mating parts. This hazard increases with chemical concentration and is greatest in this region of the eductor.

Accordingly, it is an object of the present invention to provide for a mix head eductor that is compatible with the safety concerns relevant to public water systems.

Another object of the present invention is to provide a mix head eductor which prevents any water from escaping from the air gap.

Yet another object of the present invention is to provide a mix head eductor which has exact dimensions in a one-piece construction for ensuring and maintaining the appropriate mix ratios between the diluting fluid and the concentrated fluid.

Still another object of the present invention is to provide for a mix head eductor which promotes appropriate mixing and reduces or eliminates the escape of diluting fluid through the air gap.

A further object of the present invention is to provide for a mix head eductor which can be easily inspected and installed, and which will not clog and become inoperable.

Other objects, advantages and aspects of the invention can be obtained from a review of the below-described embodiments of the invention and from the figures and claims.

BRIEF DESCRIPTION OF THE FIGURES

FIG. 4 depicts a cross-sectional view of the mix head eductor along the line 4—4 in FIG. 2 and showing the ribs.

DETAILED DESCRIPTION OF THE PREFERRED EMBODIMENT

Figure 3:
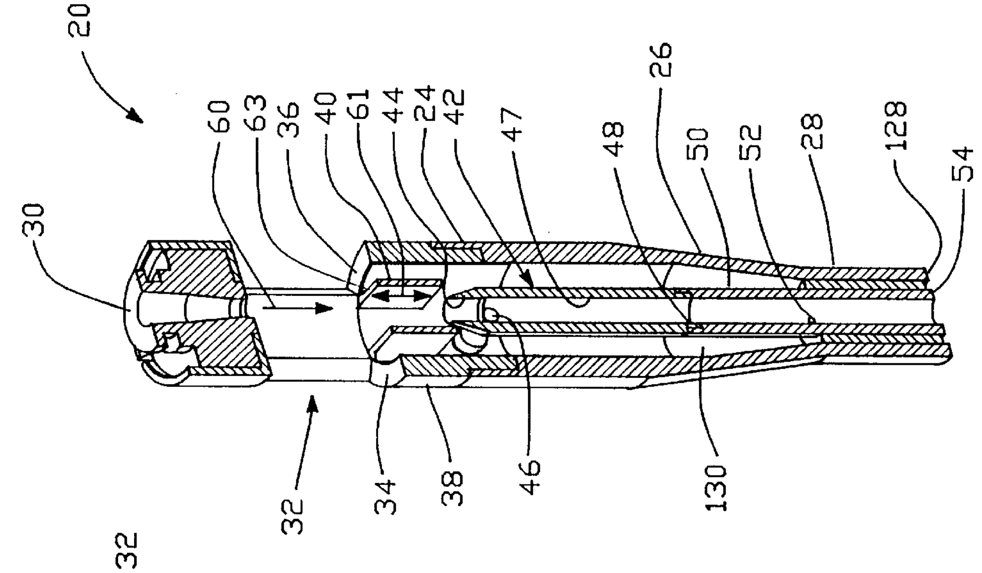
FIG. 3 depicts a full length perspective cross-sectional view of the mix head eductor of FIG. 2 along line 3—3.
Figure 2:
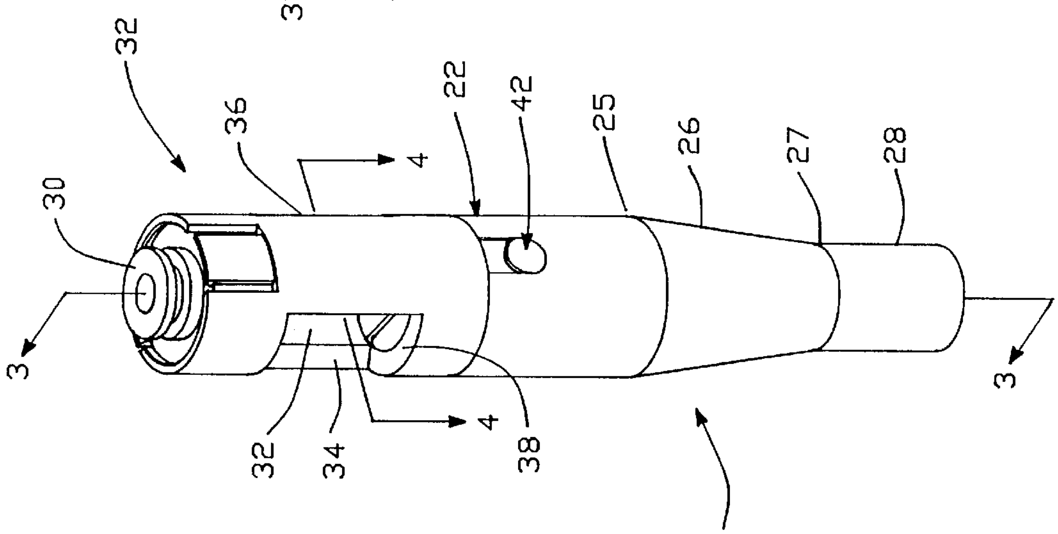
FIG. 2 is a perspective view of the mix head eductor of the invention somewhat rotated from that of FIG. 1.
Figure 1:
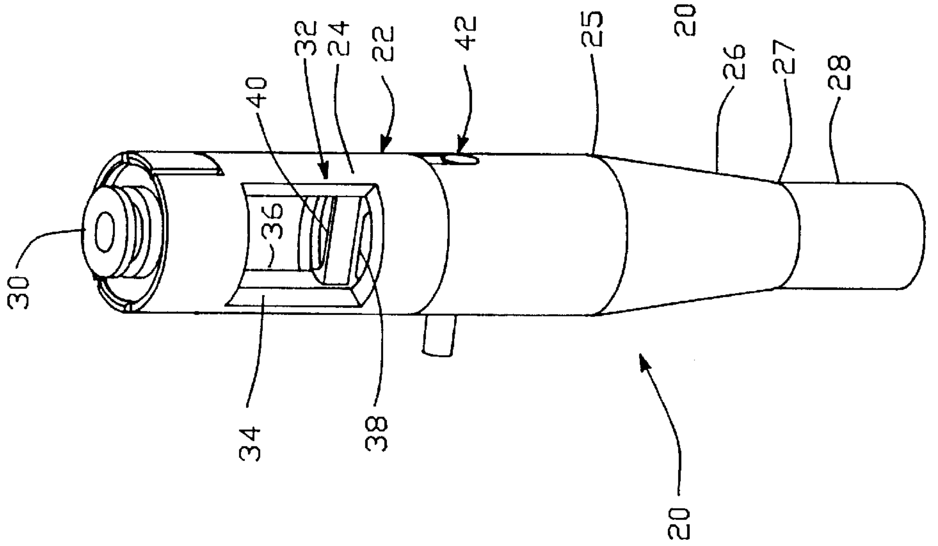
FIG. 1 is a perspective view of the mix head eductor of the invention.

With reference to the figures and in particular FIGS. 1 and 2, the preferred embodiment of the mix head eductor of the invention is depicted and identified by the number 20. Mix head eductor 20 includes a body 22 which has an upper substantially cylindrical portion 24, a conical portion 26 extending therefrom, and a lower cylindrical portion 28. Cylindrical portion 24 extends to line 25 where conical portion 26 begins, and conical portion 26 extends to line 27 where cylindrical portion 28 begins. Reviewing FIGS. 1, 2 and 3, the mix head eductor 20 includes a fluid inlet port 30 which is adapted to be connected to, for example, a public water source. Downstream of fluids inlet port 30 is an air gap 32 which prevents fluid back flow or siphoning into the public water source. Air gap 32 includes first and second air gap ports 34 and 36. Down stream of the air gap 32 are first and second ribs 38, 40, which assist in preventing fluid from exiting the air gap 32, as will be described more fully hereinbelow. Following the ribs is the eductor 42 of the invention. Eductor 42 includes a first eductor fluid inlet port 44 which receives a stream of water from, for example, the public water supply and a second eductor fluid inlet port 46 which is adapted to be connected to a source of concentrated chemicals such as concentrated liquid cleaners or disinfectants. Eductor 42 further includes a first stage diffuser 47 and a first eductor fluid outlet port 48 which is located at the end of the first stage diffuser 47. Fluid outlet port 48 communicates with a second stage diffuser tube 50. Diffuser tube 50 includes diffuser pin 52 which ensures that first stage diffuser 47 and second stage diffuser tube 50 are filled with and mix the concentrated chemical provided through the eductor fluid inlet port 46 and the water provided through a first eductor fluid inlet port 44. This mixture exits through the diffuser tube outlet 54.

A fuller discussion about the above features of the preferred mix head eductor 20 of the invention is now set out.

Figure 9:
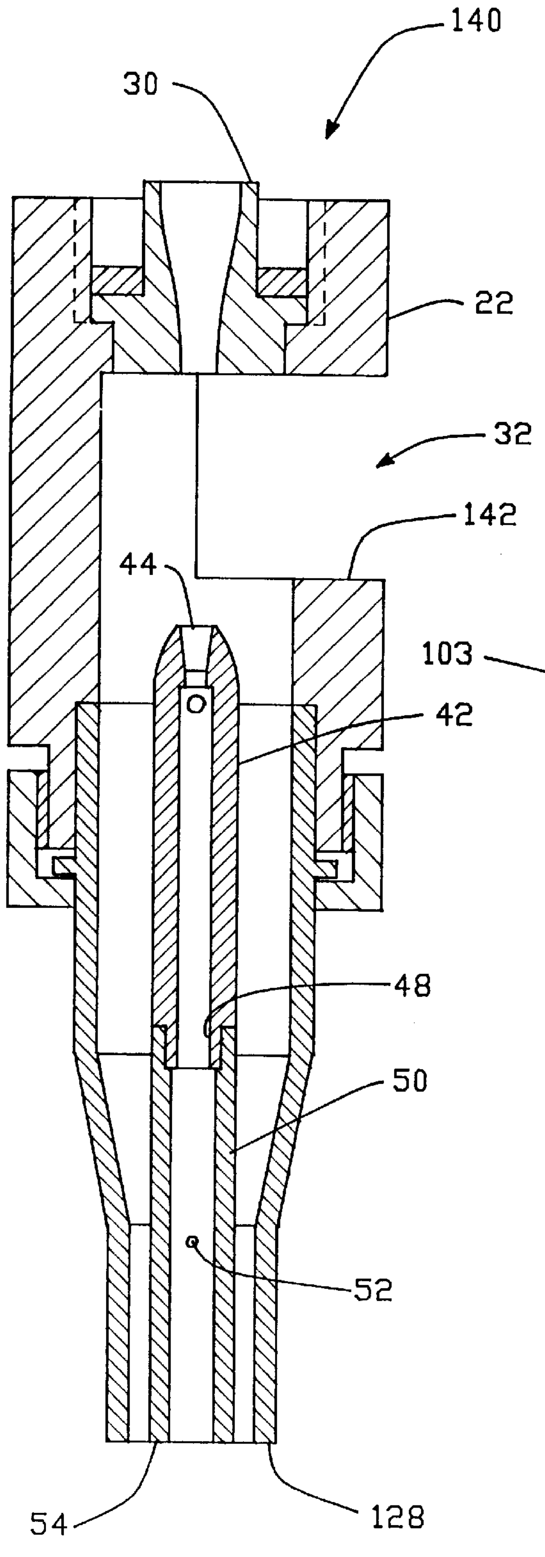
FIG. 9 depicts an alternate embodiment of the mix head eductor with a single air gap port.
Figure 10:
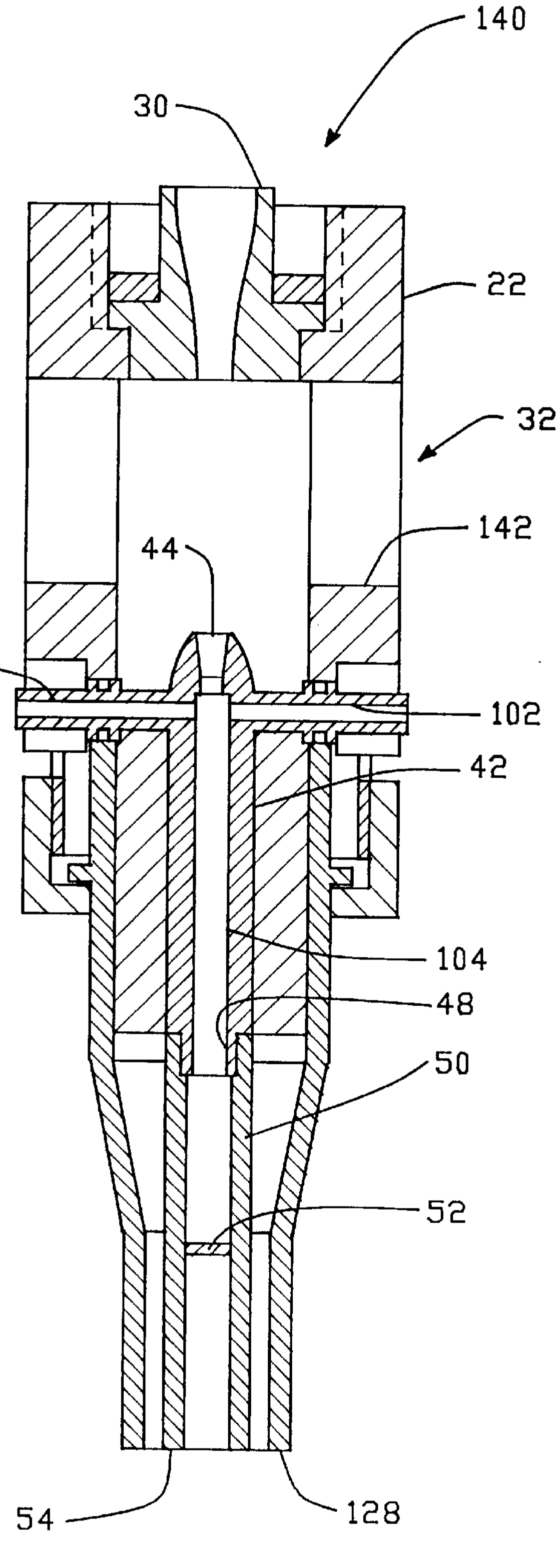
FIG. 10 depicts a cross-sectional view of the embodiment of FIG. 9 rotated about 90° about the longitudinal axis of the embodiment of FIG. 9.

Preferably the fluid inlet port 30 is inwardly sloping with a champagne-glass shape, as is known to one of ordinary skill in the art, in order to create a smooth collimated stream of fluid which is directed downwardly through the air gap 32. In a preferred embodiment, the air gap 32 is over an inch (2.54 cm) in length and includes the above-indicated first and second air gap ports 34, 36 which air gap port 34, 36 each span preferably a 90° circumferential arc for a total of about 180° of air gap openings. As can be seen in the embodiment of FIGS. 9 and 10, the air gap can alternatively be comprised of a single air gap port 142 which describes a circumferential arc of 180°.

The first and second ribs 38, 40 are located immediately downstream of the air gap 32. Each of said ribs 38, 40 has (1) a major dimension such as major dimension 41 of rib 40 which extends along the direction 60 of flow of fluid from said fluid inlet port to said eductor, and (2) a minor dimension 63 which is smaller than the major dimension and which is the embodiment of FIG. 3 extends across the direction 60. In the preferred embodiment, the first and second ribs 38, 40 includes semicylindrical portions 56, 58 (FIG. 4), respectively. These semicylindrical portions 56, 58 are designed to be spaced from and partially surround the stream of fluid from the fluid inlet port 30 along the direction of flow 60 of the stream of diluting fluid. The semicylindrical part 56 of first rib 38 is designed to prevent fluid from exiting the first air gap port 34. Similarly the second semicylindrical part 58 of the second rib 40 is designed to prevent fluid from exiting the second air gap port 36. As can be seen in FIG. 4, preferably the semicylindrical parts 56, 58 describe an arc of about 90° following the arc of the respectively air gap ports 34, 36. The semicylindrical parts 56, 58 of the first and second ribs 38, 40 are secured to the wall 62 of the mix head eductor body 22 with planar wing walls 64, 66 in the case of first rib 38 and planar wing walls 68, 70 in the case of second rib 40. These wing walls extend rearwardly from the semicylindrical part preferably at about a 90° angle from the semicylindrical part and also are received by the wall 62 of the mix head eductor body 22 at approximately a 90° angle. As the portions 72, 74 of the wall 62 of the mix head body 22 block the exit of fluid, there is no requirement that the ribs 38, 40 perform such functions and thus the wing walls extend rearwardly from the semicylindrical parts 56, 58. The first and second ribs 38, 40 extend from the bottom of each respective air gap port 34, 36 downwardly in the direction of flow 60 of the fluid stream and end just above the first eductor fluid inlet port 44 of the eductor 42.

Figure 5:
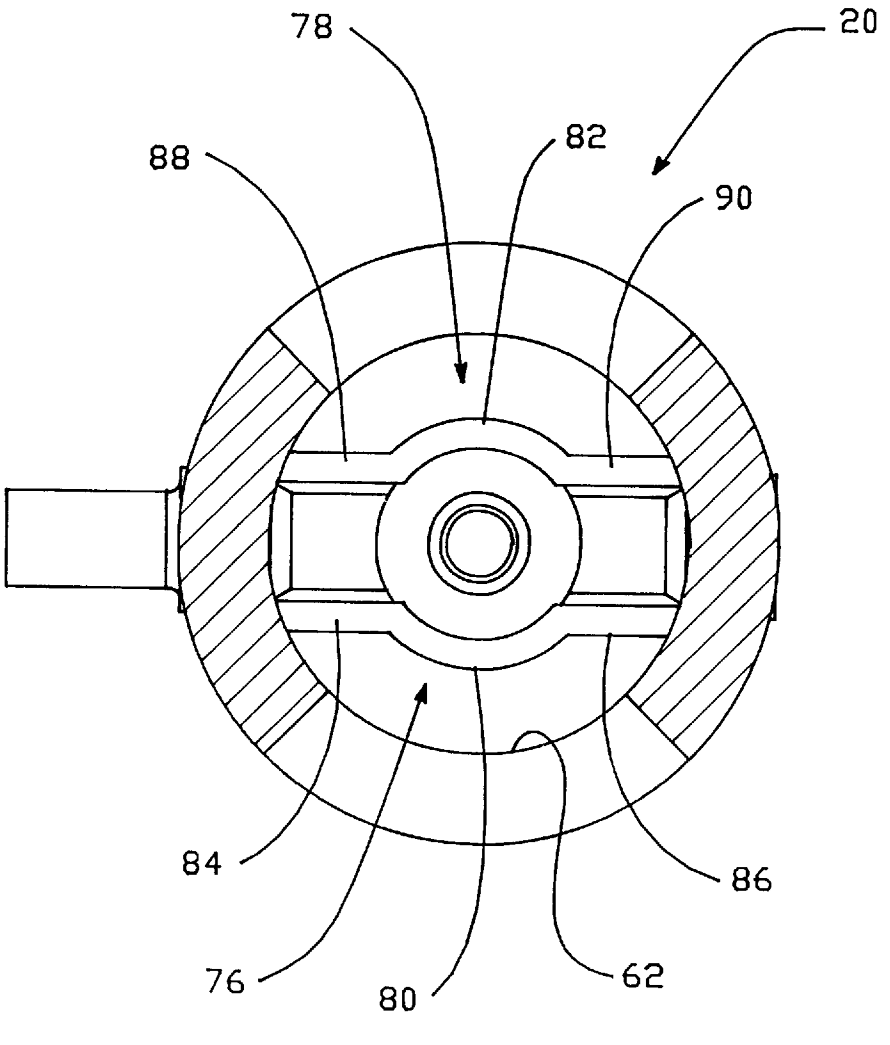
FIG. 5 is a view similar to FIG. 4 with a different rib design.
Figure 6:
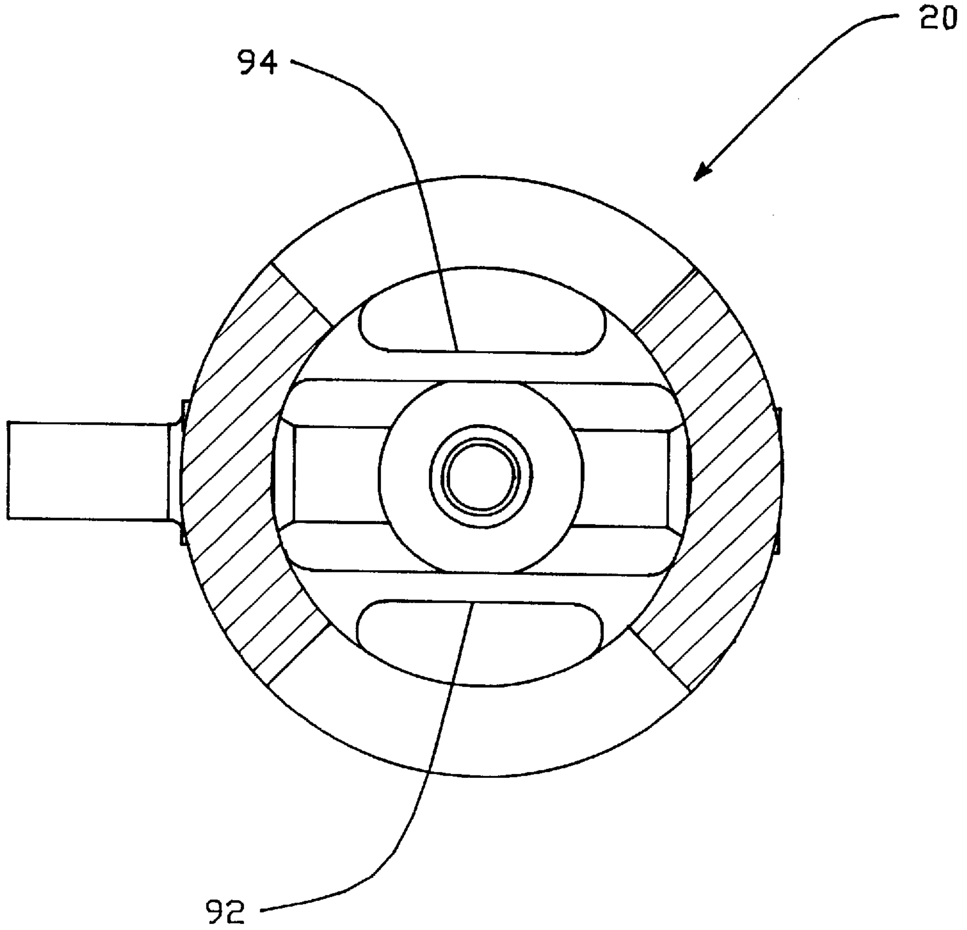
FIG. 6 is a view similar to FIG. 4 with yet a different rib design.

Alternative embodiments of the ribs are shown in FIGS. 5 and 6. In FIG. 5, the first and second ribs 76, 78 have semicylindrical parts 80, 82. Walls 84, 86 secure the first semicylindrical part of first rib 76 to the wall 62 of the mix head eductor body 22. Similarly, walls 88 and 90 secure the second semicylindrical part 82 of the second rib 40 to the wall 62 of the mix head eductor body 22. It can be seen in this embodiment that all the walls 84, 86, 88 and 90 are parallel to each other.

Yet another embodiment of the ribs is shown in FIG. 6. In this embodiment, the first and second ribs 92, 94 are comprised of parallel and fully planar structures.

Figures 7A, 7B, 7C, 7D, 7E, 7F:
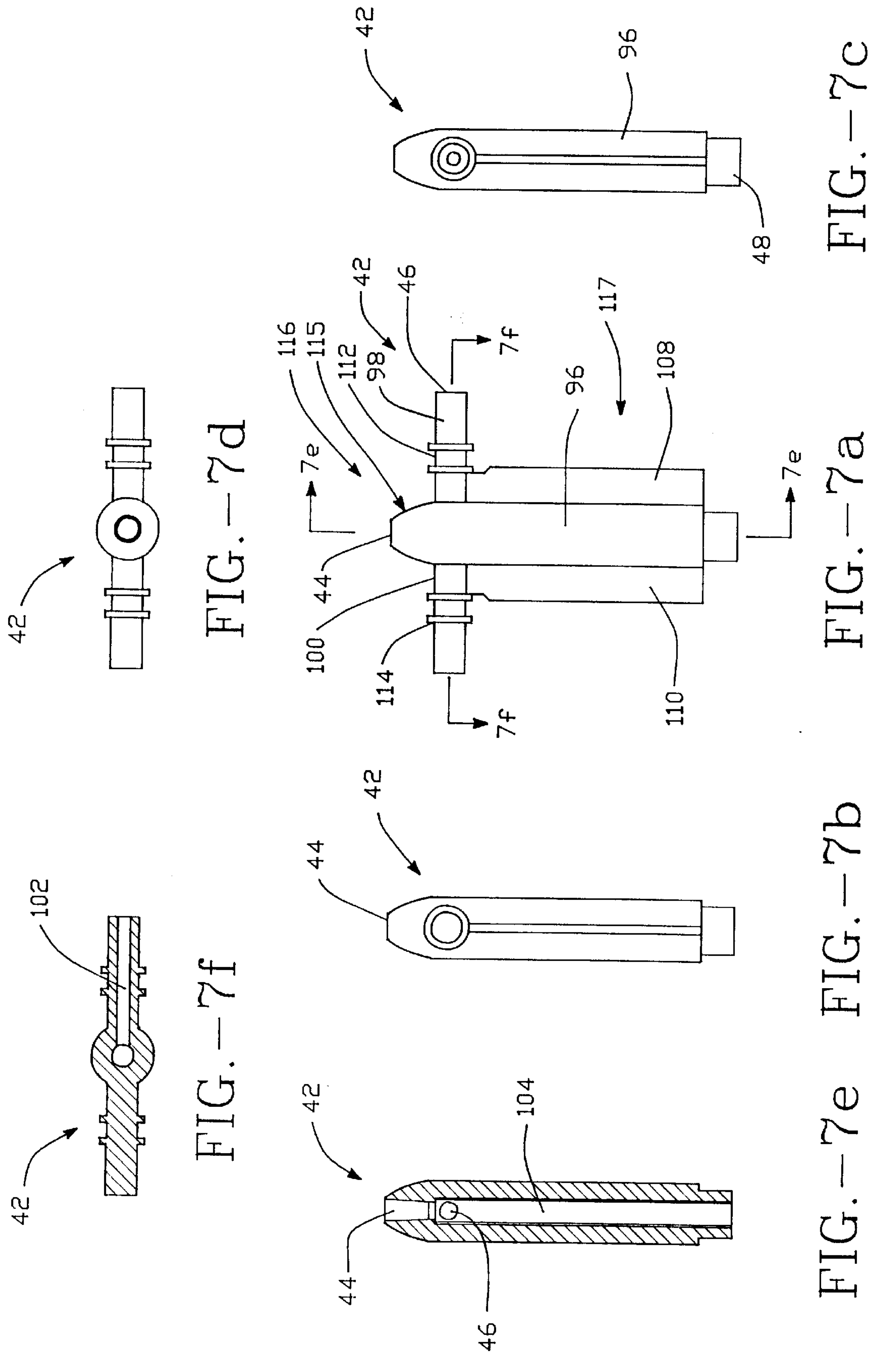
FIG. 7*a* is an elevation view of the eductor of the invention.
FIG. 7*b* is a left side view of the eductor of FIG. 7*a*.
FIG. 7*c* is a right side view of the eductor of FIG. 7*a*.
FIG. 7*d* is a top view of the eductor of FIG. 7*a*.
FIG. 7*e* is a cross-sectional view of the eductor along the line 7*e*—7*e* of FIG. 7*b*.
FIG. 7*f* is a cross-sectional view of the eductor along the line 7*f*—7*f* of FIG. 7*d*.

Eductor 42 is more specifically depicted in FIG. 7*a* through 7*f*. In FIG. 7*a* the first and second eductor fluid inlet ports 44 and 46 are depicted. As described above, the first eductor inlet port 44 receives the diluting fluid which has passed through the air gap 32. The second eductor fluid inlet port 46 is adapted to be connected to a source of concentrated fluids such as a cleaner or disinfectant. Eductor 42 further includes an elongate cylindrical eductor body 96. Extending therefrom are first and second support arms 98, 100. As can be seen in FIG. 7*f* first support arm 98 defines both the second eductor fluid inlet port 46 as well as a channel 102. Eductor body 96 describes a channel 104 (FIG. 7*e*) which runs the full length of eductor body 96 from the fluid inlet port 44 and ending in eductor fluid outlet port 48. Channels 102 and 104 communicate with each other at approximately 90° angle in this preferred embodiment. Extending between the eductor body 96 and the support arms 98, 100 are first and second supporting and fluid channeling eductor fins 108, 110.

The first and second support arms 98, 100 include first and second sets of circumferential ribs 112, 114 which can hold elastomeric sealing O-rings (not shown). These ribs 112, 114 engage the wall 62 of the mix head eductor body 22 in order to position and space the eductor body 96 from the wall 62.

As can be seen in FIGS. 7*a*–7*f*, the eductor is of a one-piece construction. The eductor 42 is molded from industrial plastic or preferably engineering thermo-plastic such as glass-filled polypropylene and has smooth surfaces. The one-piece construction is instrumental in (1) ensuring that the eductor 42 extends the range of attached flow, as will be discussed below, and (2) providing for an accurate mix ratio of diluting fluid to concentrated fluid throughout the life of the mix head eductor 22.

With respect to the above first point and focusing more closely on the first eductor inlet port 44 and the leading portion 115 of the exterior surface 116 thereabout, it can be seen that the leading portion 115 in FIG. 7*a* is rounded and smooth. The exterior surface also includes trailing portion 117. The leading portion 115 is annular (as seen in FIG. 7*d*), and smooth and extends continuously and outwardly from the inlet port 44 toward the trailing portion. The rounded and smooth exterior surface 116 leading up to the eductor first fluid inlet port 44 ensures that the fluid from the downwardly projecting diluting fluid stream stays attached to the exterior surface 116 further down the exterior surface 116 of the eductor body 96 than would occur if a differently shaped exterior surface were present. Such attached flow reduces the amount of fluid that can bounce off the eductor 42, back toward the air gap 32. Such attached flow means that the fluid flows down along the eductor for a distance before the fluid breaks apart from or otherwise separates from the eductor. Accordingly, an envelope of fluid surrounds the eductor and is the main inhibitor to fluid being directed back towards the air gap. Further with respect to the second point, the smooth rounded surface adjacent the eductor inlet 44 does not pit and become misconfigured as would a sharp edge, and thus the mix or proportioning ratio remains more constant over the useful life of the mix head eductor 20. Also, due to one-piece construction, there are no piece mating joints or grooves which can collect concentrated or diluting fluids or a mixture thereof. Such joints or groove would tend to enlarge over time resulting in a changing mix or proportioning ratio.

Figure 8:
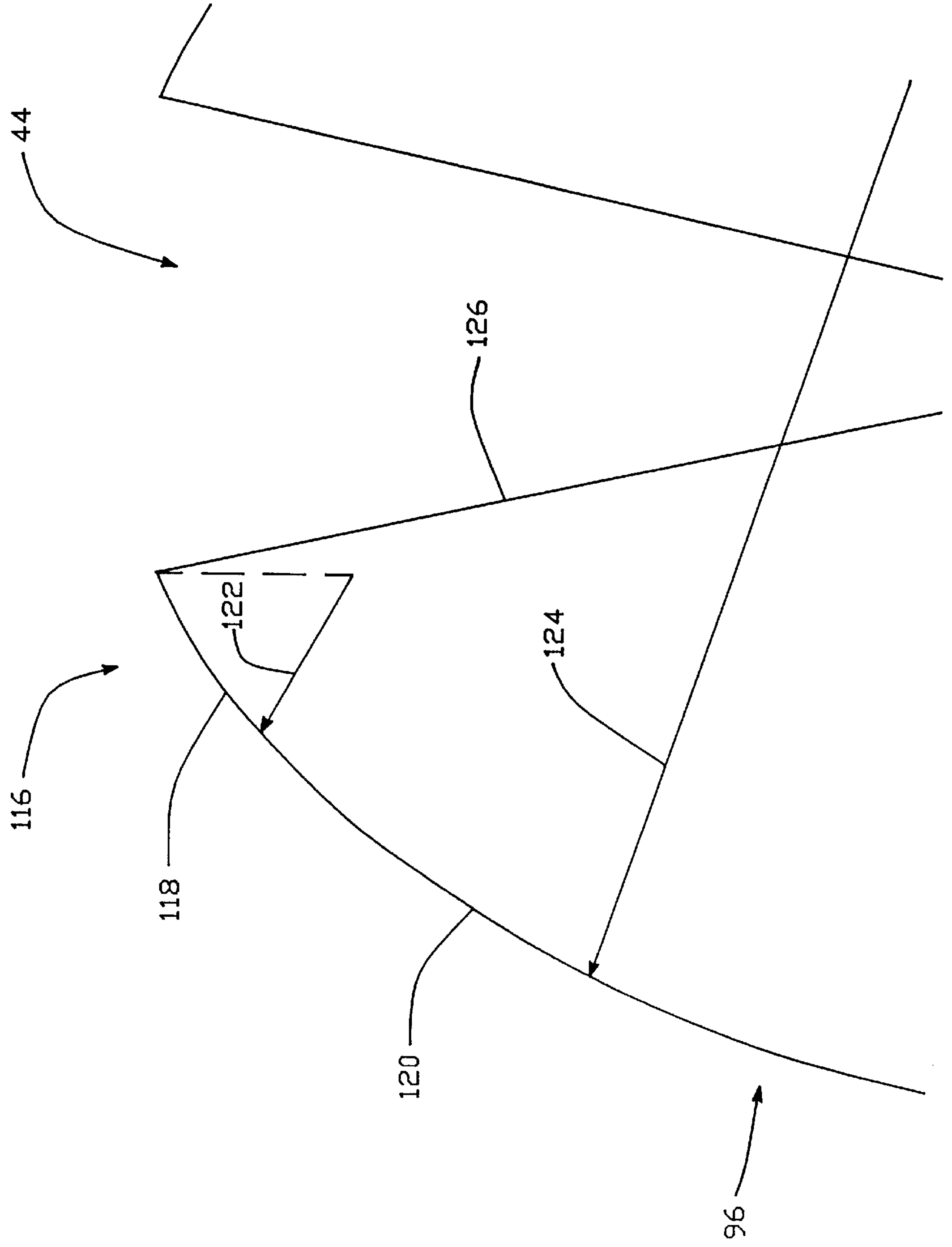
FIG. 8 is an enlarged cross-sectional view of the preferred eductor inlet port of the invention.

A more specific embodiment of the first eductor fluid inlet port 44 and the exterior surface 116 can be seen in FIG. 8. It is to be recalled that in a preferred embodiment, the stream of fluid flowing downwardly, in the direction of flow 60, and strikes the first eductor fluid inlet port 44. Also, the peripheral portion of the fluid stream strikes the exterior surface 116 of the eductor outwardly of the first eductor fluid inlet port 44. In FIG. 8, the exterior surface 116 is a compound configuration or shape comprised of a first rounded surface 118 and a second rounded surface 120. The first rounded surface 118 extends from the first eductor fluid inlet port 44 downwardly along the body of the eductor 96. This surface is described by a first radius 122. The second rounded surface 120 extends from the first rounded surface 118 and is described by a second radius 124. The second radius, as can be seen in FIG. 8, is substantially larger than the first radius affording a more gradual rounded surface. In a preferred embodiment, the first radius is 0.02 inches (0.5 mm) and the second radius is 0.7 inches (17.8 mm). The first rounded surface 118 in this preferred embodiment is substantially tangential to the first eductor fluid inlet port 44 and provides a blunted surface which meets the oncoming fluid stream. As described above, this compound configuration is less susceptible to pitting or the formation of irregularities due to any materials or minerals found in the fluid stream. Further this compound configuration enhances flow over the exterior surface 116 by ensuring that such flow is attached to the exterior surface 116 well past the inlet port 44. This smooth surface thus also ensures that the amount of fluid which bounces back off of the exterior surface 116 either upstream or toward the air gap ports 34, 36 is minimized. Also as seen in FIG. 8, the inlet 44 is connected to the first channel 102 by an inwardly tapering channel 126.

Returning to FIG. 3, extending downwardly from the eductor outlet port 48 is the diffuser tube 50 which includes a diffuser pin 52. As explained above, diffuser pin 52 ensures that the diffuser tube 50 and channel 104 of the eductor 42 (FIG. 7*e*) are filled with a mixture of concentrate and diluting fluid to ensure adequate mixing. As is noted above, the eductor 42 is spaced from the wall 62 of the mix head eductor body 22. Similarly, the diffuser tube 50 is spaced from the wall 62. The wall 62, however, becomes conically reduced about the diffuser tube 50. Wall 62 then mates with a reduced diameter cylindrical portion 28 which is substantially parallel to the diffuser tube 50. Fluid exit port 128 of body 22 is located immediately adjacent the diffuser tube outlet 54. At this point, the mixture of concentrate and diluting fluids is further diluted by the diluting fluid which proceeded down past the exterior surface of eductor 42 and through the annular space 130 defined between the eductor 42 and the diffuser tube 50 on the one hand, and inside wall 62 of the mix head eductor body 22 on the other hand.

An alternative embodiment of the invention is shown in FIGS. 9 and 10 and is identified as mix head eductor 140. All elements of mix head eductor 140 which are similar to the mix head eductor 20 of FIGS. 1 and 2 are similarly numbered. It is immediately noticeable that with this mix head eductor 140 that the air gap 32 is comprised of a single air gap port 142 which describes an arc of approximately 180°. As with the embodiment of FIG. 1, this configuration also ensures that the air gap 32 is in no way blocked or made to malfunction and that the air gap 32 is easy to inspect. It is also noticeable in this configuration that no ribs are required to deflect fluid from exiting the air gap 32 through the air gap port 132. If desired, however, a rib such as disclosed above could be included in this embodiment. It should also be noted in this embodiment that eductor 42 has channels 102 and 103 that communicate with channel 104. Channels 102 and 103 are provided in the support arms 98, 100 respectively, for allowing the eductor to draw in and mix two separate concentrated fluids, if two different concentrated fluids are desired, and have these concentrated fluids mix with the diluting fluid. Alternatively, the same concentrated fluid can be provided through both channels 102 and 103. Further, if desired, the diameter of channels 102 and 103 can be different if a different volume mix ratio is desired between the concentrated fluid introduced through channel 102 and the concentrated fluid introduced through channel 103. It is to be understood that a channel such as channel 103 can be placed in the support arm 100 of the other embodiments of this invention.

INDUSTRIAL APPLICABILITY

As can be seen from the above, the invention provides for a mix head eductor 20 which satisfies city, municipal and state codes and requirements concerning safety with respect to preventing the back flow of contaminants into the public water supply and inspection. Further, the mix head eductor 20 ensures attached flow, inhibiting fluid from exiting the air gap ports 32, 34. The mix head eductor 20 also ensures that the exact mixing ratio is maintained throughout the life of the mix head eductor 20 due to the specially designed eductor 42.

Other aspects, embodiments and objects of the invention can be obtained through a review of the figures and the attached claims.

It is to be understood that embodiments of the invention other than those depicted and described herein can be constructed and fall within the scope and spirit of the claimed invention.

We claim:

1. An eductor apparatus comprising:

an eductor housing;

a fluid inlet port;

an air gap consisting of an air gap port and a bore in the housing communicating with said air gap port, said bore and air gap port being free from obstructions, said air gap located down stream of said fluid inlet port;

a one-piece eductor located down stream of said air gap, the eductor being of separate construction from the rest of the eductor apparatus;

a rib extending from the housing and located below the air gap port so that said air gap port is unobstructed by said rib, and said rib located between the air gap and the eductor, said rib having a major dimension and a minor dimension that is smaller than the minor dimension, which major dimension extends along a direction of flow from the fluid inlet port through the bore of the air gap and to the eductor;

said eductor includes an eductor body which has an exterior surface comprising a leading portion and a trailing portion;

said eductor including a first inlet port located in said leading portion;

said eductor including a first outlet port located in said trailing portion;

said leading portion comprising an annular rounded surface extending continuously and outwardly from the inlet port to the trailing portion;

a first channel defined in said eductor body which communicates said first inlet port to said first outlet port;

said eductor including a support arm, which support arm extends at an angle from said eductor body;

said eductor including a second inlet port;

said second inlet port defined in said support arm;

a second channel defined in said support arm and which second channel communicates said second inlet port with said first channel;

a second support arm which is disposed in a direction opposite to said support arm;

wherein said first channel defines a primary fluid flow path, and a secondary fluid flow path is defined between the eductor body and the eductor housing; and wherein said rib is positioned relative to said first inlet port of said eductor in order to permit fluid to flow from said fluid inlet port both into said first inlet port of eductor and over the exterior surface of The leading portion of said eductor.

2. The eductor apparatus of claim 1 wherein:

said rib is entirely parallel to the direction of fluid flow from the fluid inlet port through the air gap and to the eductor.

3. The eductor apparatus of claim 1 including:

said rib is at least in part planar.

4. The eductor apparatus of claim 1 including:

said rib is at least in part planar and at least in part semicylindrical.

5. The eductor apparatus of claim 4 including:

said semicylindrical part of said rib is located about a stream of fluid which can flow from the fluid inlet port through the air gap and to the eductor.

6. The eductor apparatus of claim 1 including:

a second rib located adjacent to said rib; and wherein a stream of fluid, flowing from the fluid inlet port to said eductor, passes between said rib and second rib.

7. The eductor apparatus of claim 1 wherein:

said air gap includes a second air gap port, which said second air gap port is located opposite to said air gap port; and a second rib, said second rib located opposite to said rib.

8. The eductor apparatus of claim 6 wherein:

said rib and said second rib are planar and substantially parallel to each other.

9. The eductor apparatus of claim 6 wherein:

said rib has a first cylindrical portion and said second rib has a second cylindrical portion, and wherein said first cylindrical portion faces and is concave toward the second cylindrical portion, and wherein said second cylindrical portion faces and is concave toward the first cylindrical portion such that said first and second cylindrical portions define a cylindrical space therebetween.

10. The eductor apparatus of claim 1 wherein:

said fluid inlet port is champagne-glass shaped in order to promote collimated flow.

11. The eductor apparatus of claim 1 including:

said rib has a semicylindrical part with a first wing wall and a second wing wall extending therefrom in order to support the semicylindrical part.

12. The eductor apparatus of claim 11 wherein at least one of said first and second wing wails is about perpendicular to the semicylindrical part.

13. The eductor apparatus of claim 1 including:

said rib is at least in part semicylindrical.

14. The eductor apparatus of claim 1 wherein:

said exterior surface adjacent to said eductor inlet port is shared such that the exterior surface enhances attached fluid flow over said eductor.

15. The eductor apparatus of claim 1 wherein:

said exterior surface is comprised of a compound surface, a first rounded surface described by a first radius and a second rounded surface described by a second radius; and said first rounded surface contacts said eductor inlet port and said second rounded surface contacts said first rounded surface.

16. The eductor apparatus of claim 15 wherein:

said first radius is smaller that said second radius.

17. The eductor apparatus of claim 15 wherein:

said first rounded surface meets the eductor inlet port tangentially.

18. The eductor apparatus of claim 1 wherein:

said eductor has an inwardly tapered channel communicating with the eductor inlet port.

19. The eductor apparatus of claim 1 including;

a first fin extending from said support arm toward said trailing portion of said eductor body and connected to said eductor body; and a second fin extending from said second support arm toward said trailing portion of said eductor body and connected to said eductor body.

20. The eductor of claim 1 including:

a third inlet port;

said third inlet port defined in said second support arm; and a third channel defined in the second support arm, which third channel communicates said third inlet port with said first channel.

21. The eductor of claim 20 wherein:

said second channel has a first diameter and the third channel has a second diameter; and wherein the first diameter is different from the second diameter.

22. The eductor apparatus of claim 1 wherein:

said eductor is T-shaped (1) so that it can be conveniently assembled into the eductor apparatus and (2) so that a ratio of concentrated fluid to diluting fluid which pass through the eductor can be selected through the selection of an appropriate eductor.

23. The eductor apparatus of claim 1 wherein:

said eductor is of said one-piece construction (1) so that it can be conveniently assembled into the eductor apparatus and (2) so that a ratio of concentrated fluid to diluting fluid can be selected through the selection of an appropriate eductor.

24. The eductor apparatus of claim 1 wherein:

said support arm, said second support arm, and said eductor body are provided in a T-shaped configuration.

* * * * *

UNITED STATES PATENT AND TRADEMARK OFFICE

CERTIFICATE OF CORRECTION

PATENT NO. : 5,839,474
DATED : November 24, 1998
INVENTOR(S) : Michael J. Greaney It is certified that error appears in the above-indentified patent and that said Letters Patent is hereby corrected as shown below:

Claim 12, Column 9, Line 31: After "wing" and before "is" insert --walls--

Application, Page 15, Claim 16, Line 12, After "wing" and before "is" is " walls"

Claim 14, Column 9, Line 37: After "is" and before "such" insert --shaped--

Response mailed 11/24/97, Page 4, Claim 18, Line 11, after "is" and before "such" is "shaped"

Signed and Sealed this

Twenty-third Day of March, 1999

*Attest:*

Q. TODD DICKINSON

*Attesting Officer*

*Acting Commissioner of Patents and Trademarks*

UNITED STATES PATENT AND TRADEMARK OFFICE

CERTIFICATE OF CORRECTION

PATENT NO. : 5,839,474
DATED : November 24, 1998
INVENTOR(S) : Michael J. Greaney It is certified that error appears in the above-identified patent and that said Letters Patent is hereby corrected as shown below:

Claim 1, Column 8, Line 17: After "the" and before "dimension" delete "minor" and insert --major---.

Signed and Sealed this

Eighth Day of August, 2000

Attest:

Q. TODD DICKINSON

*Attesting Officer*

*Director of Patents and Trademarks*